United States Patent [19]

Miyake et al.

[11] Patent Number: 4,870,928
[45] Date of Patent: Oct. 3, 1989

[54] TWO-CYLINDER ENGINE

[75] Inventors: Hitomi Miyake, Miki; Shigeru Nishimura, Kobe, both of Japan

[73] Assignee: Kawasaki Jukogyo Kabushiki Kaisha, Japan

[21] Appl. No.: 284,717

[22] Filed: Dec. 14, 1988

[30] Foreign Application Priority Data

Dec. 17, 1987 [JP] Japan .................. 62-192191[U]

[51] Int. Cl.⁴ .......................................... F02M 27/00
[52] U.S. Cl. ................................................ 123/52 MV
[58] Field of Search ......... 123/52 M, 52 MB, 52 MC, 123/52 MV

[56] References Cited

U.S. PATENT DOCUMENTS

| | | | |
|---|---|---|---|
| 2,759,462 | 8/1956 | Haltenberger | 128/52 MV |
| 2,806,457 | 9/1957 | Moseley | 123/52 MV |
| 2,827,890 | 3/1958 | Baumgartner | 123/52 MV |
| 3,730,160 | 5/1973 | Hughes | 123/52 M |
| 4,697,557 | 10/1987 | Tamba et al. | 123/52 MV |
| 4,708,097 | 11/1987 | Hatamura et al. | 123/52 M |

FOREIGN PATENT DOCUMENTS 1216015 5/1966 Fed. Rep. of Germany ... 123/52 M
57-119155 7/1982 Japan .

Primary Examiner—David A. Okonsky
Attorney, Agent, or Firm—Leydig, Voit & Mayer

[57] ABSTRACT

A two-cylinder engine comprises a first cylinder and a second cylinder adapted to perform explosions at such timing that an interval from explosion in the first cylinder to explosion in the second cylinder becomes shorter than an interval from the explosion in the second cylinder to the explosion in the first cylinder, a single carburetor, and an intake manifold having an intake passage communicating with the carburetor and first and second branch passages branched from the intake passage and communicating with the respective cylinders. The intake passage and the branch passages are arranged such that an angle formed between an axis of the intake passage and an axis of the first branch passage becomes smaller than an angle formed between the axis of the intake passage and an axis of the second branch passage.

2 Claims, 2 Drawing Sheets

TWO-CYLINDER ENGINE

BACKGROUND OF THE INVENTION

1. Field of the Invention

The present invention relates to a two-cylinder engine, such as a V-type engine, which has different explosion intervals between two cylinders, and more particularly it relates to a two-cylinder engine having an improved intake manifold.

2. Description of the Prior Art

Conventionally, there has been proposed a V-type engine of the type in which air-fuel mixture is sucked or introduced into a plurality of cylinders through a single intake manifold. Such engine is disclosed in Japanese Patent Unexamined Publication No. 57-119155, for example. In such conventional V-type engine, the construction of the engine is simplified by providing a single intake manifold.

However, since the engine of this type has unequal intake stroke intervals between the cylinders, distribution of fuel into the respective cylinders may be unbalanced due to intake inertia and hence air-fuel ratios of the mixtures introduced into the respective cylinders may not necessarily be equal to each other. Consequently, disadvantageous phenomena such as knocking, misfire, run-on and after-burn may occur in the cylinder of non-optimim air-fuel ratio.

SUMMARY OF THE INVENTION

It is an object of the present invention to provide a two-cylinder engine which can eliminate unbalanced distribution of fuel and an unequal air-fuel ratios between the cylinders, thereby balancing the air-fuel ratios between the cylinders to obtain normal and optimum operating condition.

In accordance with the invention, there is provided a two-cylinder engine comprising: a first cylinder and a second cylinder adapted to perform explosions at such timing that an interval from explosion in the first cylinder to explosion in the second cylinder becomes shorter than an interval from the explosion in the second cylinder to the explosion in the first cylinder, a single carburetor, and an intake manifold communicated between the carburetor and the cylinders for supplying an air-fuel mixture into the latter, the intake manifold having an intake passage communicating with the carburetor, a first branch passage branched from the intake passage and communicating with the first cylinder and a second branch passage branched from the intake passage and communicating with the second cylinder, the intake passage, the first branch passage and the second branch passage being arranged such that an angle formed between an axis of the intake passage and an axis of the first branch passage becomes smaller than an angle formed between the axis of the intake passage and an axis of the second branch passage.

With the structure this engine, an interval from completion of an intake stroke of the first cylinder to the initiation of an intake stroke of the second cylinder is shorter than an interval from completion of the intake stroke of the second cylinder to initiation of the intake stroke of the first cylinder. According to the invention, since the intake passage extends as being inclined to direct toward the second branch passage communicating with the second cylinder, air-fuel mixture tends to flow from the intake passage toward the second cylinder. Thus, under every throttle valve opening condition, the intake inertia of the fuel toward the first cylinder is effectively suppressed and the flow of the mixture toward the second cylinder is promoted. As a result, the fuel distribution into both cylinders may be advantageously balanced or equalized under wide range of engine operating conditions from no-load operation to full-load operation.

DETAILED DESCRIPTION OF THE PREFERRED EMBODIMENT

The invention will now be described with reference to the accompanying drawings.

Figure 1:
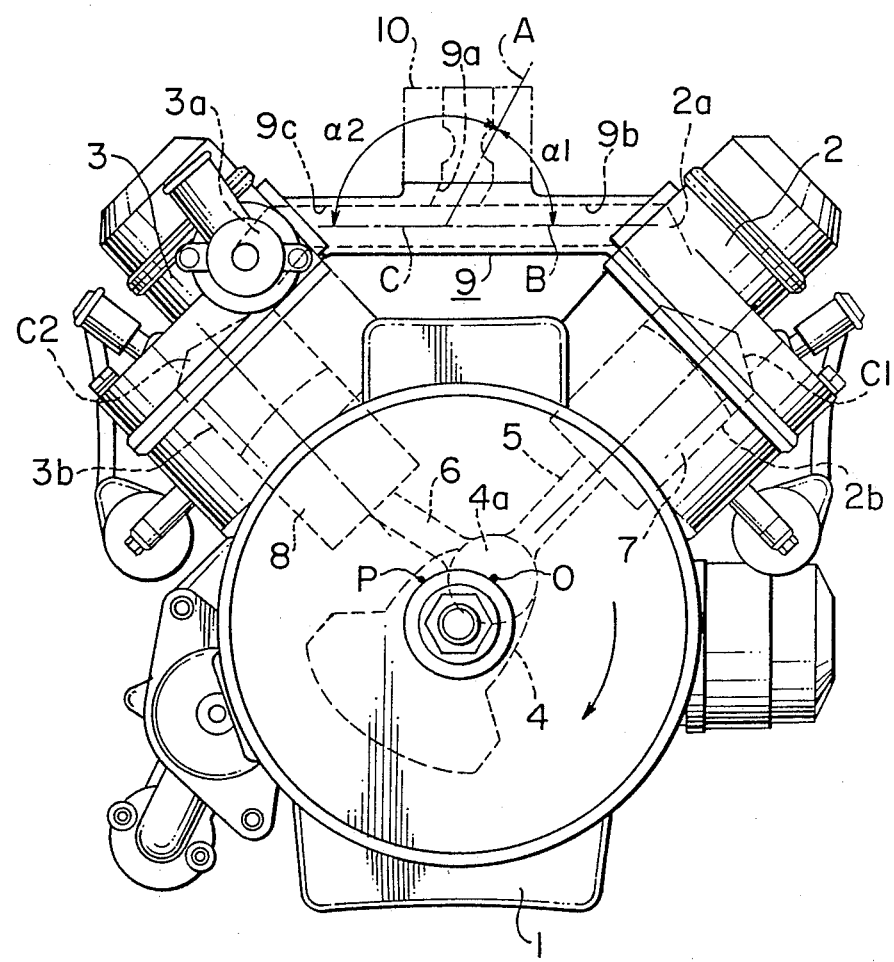
FIG. 1 is a side view of a four-cycle two-cylinder V-type engine according to an embodiment of the invention.

Referring to FIG. 1, two cylinders $2b$ and $3b$ and corresponding cylinder heads 2 and 3 are arranged on right and left sides, respectively, at an upper portion of a crankcase 1 in such a manner that center axes of the cylinders are interconnected with each other at an angle of 90° to form a V-shape. Namely, this engine is a so-called 90° two-cylinder V-type engine, and two pistons 7 and 8 are connected to a single crankshaft 4 through a pair of connecting rods 5 and 6. An intake manifold 9 includes an intake passage $9a$ communicated with a single carburetor 10, and first and second branch passages $9b$ and $9c$ are connected to intake passages $2a$ and $3a$ of the cylinder heads 2 and 3, respectively. With this construction, an air-fuel mixture is introduced from the carburetor 10 to combustion chambers C1 and C2 of the cylinders.

Figure 2:
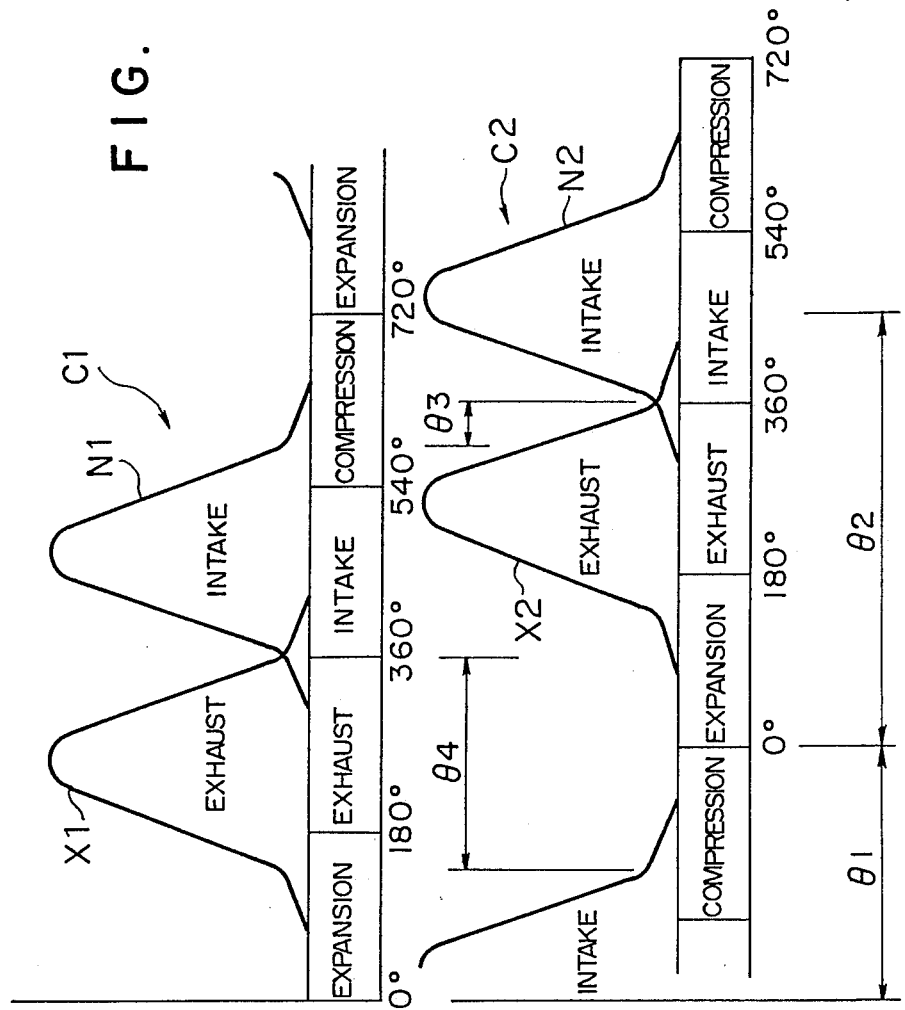
FIG. 2 is a timing chart showing operations of intake and exhaust valves of the engine shown in FIG. 1.

In operation, when the crankshaft 4 is rotated by 270° in a direction shown by an arrow after explosion in the first or right cylinder chamber or combustion chamber C1, a crank pin $4a$ is shifted to a point P. At this point P, the explosion in the second or left cylinder chamber or combustion chamber C2 will occur. On the other hand, when the crankshaft 4 is rotated by 90°+360° after explosion in the second cylinder chamber C2, the crank pin $4a$ is shifted to return to a point 0 again, where the explosion in the first cylinder chamber will occur. More particularly, in this V-type engine, as shown in FIG. 2, an interval $\theta 1$ from the explosion in the first cylinder chamber C1 to the explosion in the second cylinder chamber C2 corresponds to 270° rotation of the crankshaft, while an interval $\theta 2$ from the explosion in the second cylinder chamber C2 to the explosion in the first cylinder chamber C1 corresponds to 450° rotation of the crankshaft, and accordingly the interval $\theta 1$ is shorter than the interval $\theta 2$. As a result, an interval $\theta 3$ from completion of an intake operation of the first cylinder chamber C1 to initiation of an intake operation of the second cylinder chamber C2 will be shorter than an interval $\theta 4$ from completion of the intake operation of the second cylinder chamber C2 to initiation of the intake operation of the first cylinder chamber C1.

Incidentally, in FIG. 2, N1, N2, X1 and X2 designate lift of an intake valve of the first cylinder chamber C1, lift of an intake valve of the second cylinder chamber C2, lift of an exhaust valve of the first cylinder chamber C1 and lift of an exhaust valve of the second cylinder chamber C2, the intake valves and the exhaust valves being not shown. Further, the "interval" is described and illustrated herein as rotational angle of the crankshaft.

In the engine wherein the interval $\theta3$ from one intake operation to the other intake operation is shorter than the interval $\theta4$, at a time when the introduction of the air-fuel mixture into the second cylinder chamber C2 is started after completion of the intake operation of the first cylinder chamber C1, the evaporated fuel is being directed from the intake passage 9a to the first branch passage 9b due to the intake inertia if particular measures for suppressing such phenomenon are not taken. As a result, less fuel is introduced into the second cylinder chamber C2 and hence the air-fuel ratio therein is increased, i.e., lean air-fuel mixture is introduced thereinto. On the other hand, fuel is introduced into the first cylinder chamber C1 in relatively large amount so that the air-fuel ratio therein is decreased. In other words, relatively thick air-fuel mixture is introduced into the first cylinder chamber C1, whereas relatively lean air-fuel mixture is introduced into the second cylinder chamber C2. Consequently, knocking, misfire and run-on tend to occur in the second cylinder chamber C2 into which lean mixture is introduced, and ignition plugs relating to the first cylinder chamber C1 into which thicker mixture is introduced tend to be smeared and damaged.

The embodiment illustrated in FIG. 1 is constructed to overcome the above-described disadvantages, as will be understood from the description given hereunder.

Namely, in this embodiment, an angle $\alpha1$ formed between a central axis A of the intake passage 9a communicating with the carburetor 10 and an axis B of the first branch passage 9b communicating with the first cylinder chamber C1 is selected to 60°, for example. On the other hand, an angle $\alpha2$ formed between the central axis A of the intake passage 9a and an axis C of the second branch passage 9c communicating with the second cylinder chamber C2 is selected to 120°, for example. That is to say, the angle $\alpha1$ is so selected as to be smaller than the angle $\alpha2$ so that the intake passage 9a is directed toward the second branch passage 9c associated with the second cylinder chamber C2.

In the illustrated embodiment, the first and second branch passages 9b and 9c are arranged on a straight line and aligned with each other as shown in FIG. 1, and the carburetor 10 is arranged at a central part between the cylinder heads 2 and 3.

According to the invention, the intake passage 9a extends as being inclined to direct toward the second branch passage 9c as described hereinabove. Thus, it is possible to effectively suppress the intake inertia immediately after the intake operation at the first cylinder chamber C1 is completed, thereby making the fuel swiftly directed toward the second branch passage 9c. Consequently, the fuel which is heavier than the air and is more influenced by the intake inertia than the air is introduced into the second branch passage 9c in larger quantity than the case where the intake passage 9a is not inclined to direct to the second branch passage 9c. As a result, the thicker mixture, i.e., the air-fuel mixture of high fuel content, is supplied into the second cylinder chamber C2. Accordingly, the unbalance in air-fuel ratio between the cylinders may be effectively suppressed.

Although in the illustrated embodiment the carburetor 10 is arranged at a central part between the cylinders as described hereinabove, such arrangement is not essential. For example, it is possible to make the length of the first branch passage 9b different from the length of the second branch passage 9c and to arrange the carburetor 10 at a location nearer to the cylinder chamber C1 or cylinder chamber C2, thereby assisting or promoting adjustment of the fuel distribution.

Further, it is possible to make the diameter of the first branch passage 9b different from that of the second branch passage 9c, so as to assist or promote adjustment of the fuel distribution.

The configuration of the intake manifold 9 is not limited to the inverted T-like shape as in the illustrated embodiment. For example, the intake manifold may have an inverted Y-like shape having a first branch passage extending from the intake passage 9a to the cylinder chamber C1 as being inclined downwardly at a small angle with respect to the horizontal line and a second branch passage extending from the intake passage 9a to the cylinder chamber C2 as being inclined downwardly at a small angle with respect to the horizontal line.

Although the invention has been described and illustrated as being applied to V-type engine, it is applicable to other types of engines. For example, the invention may be applied to horizontal opposed, four-cycle two-cylinder engine in which explosion intervals $\theta1$ and $\theta2$ (FIG. 2) between two cylinder chambers are different from each other. Also it is applicable to two-cycle engines.

As will be apparent from the foregoing description, according to the invention, the unbalance in air-fuel ratio between the cylinders is effectively suppressed and hence air-fuel ratios of the mixtures in both cylinder chambers may be set or adjusted to optimum values. Since the possibility of the lean mixture having inappropriately low fuel content being introduced into one of the cylinder chambers is effectively suppressed, it is possible to prevent knocking, misfire, run-on and afterburn from being produced. At the same time, the smearing and damage of ignition plugs may be avoided since the possibility of the thick mixture having inappropriately high fuel content being introduced into the other cylinder chamber is effectively suppressed. Further, the invention brings about these meritorious effects without causing the problems relating to the layout of the engine.

We claim:

1. A two-cylinder engine comprising:

a first cylinder and a second cylinder adapted to perform explosions at such timing that an interval from explosion in said first cylinder to explosion in said second cylinder is shorter than an interval from the explosion in said second cylinder to the explosion in said first cylinder, a single carburetor, and an intake manifold communicating between said carburetor and said cylinders for supplying an air-fuel mixture into the latter, said intake manifold having an intake passage communicated with said carburetor, a first branch passage branched from said intake passage and communicating with said first cylinder and a second branch passage branched from said intake passage and communicating with said second cylinder, said intake passage, said first branch passage and said second branch passage being arranged such that an angle formed between an axis of said intake passage and an axis of said first branch passage is smaller than an angle formed between the axis of said intake passage and an axis of said second branch passage.

2. A two-cylinder engine as set forth in claim 1, wherein said first branch passage and said second branch passage are arranged substantially horizontally and aligned with each other, and said carburetor is arranged at substantially a central part between said cylinders.

* * * * *